Sept. 7, 1943.    J. F. HENNESSY    2,328,978
BROILER GRILL AND DRIP PAN THEREFOR
Filed June 9, 1941    2 Sheets-Sheet 1
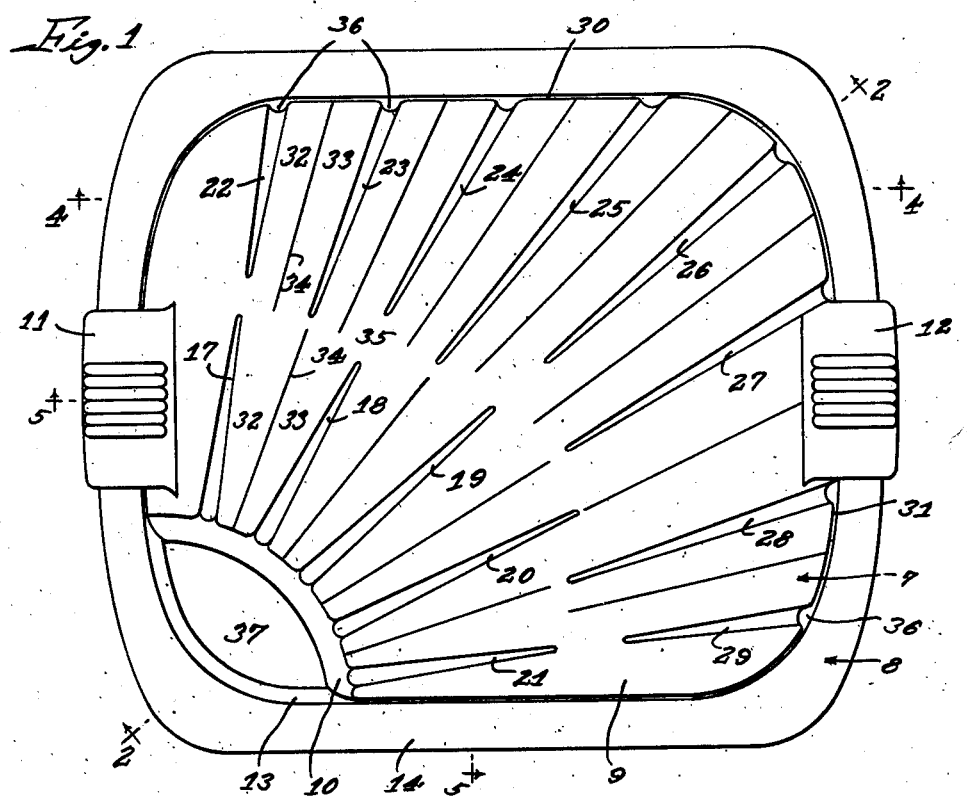
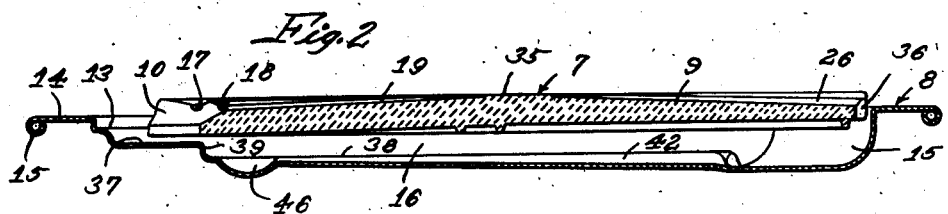
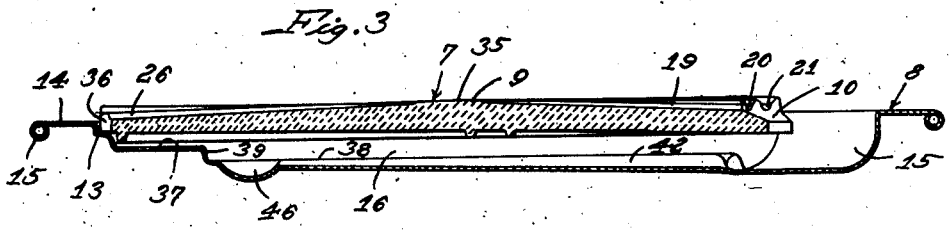

Sept. 7, 1943.    J. F. HENNESSY    2,328,978
BROILER GRILL AND DRIP PAN THEREFOR
Filed June 9, 1941    2 Sheets-Sheet 2

Patented Sept. 7, 1943

2,328,978

UNITED STATES PATENT OFFICE 2,328,978

BROILER GRILL AND DRIP PAN THEREFOR

John F. Hennessy, Rockford, Ill., assignor to Geo. D. Roper Corporation, Rockford, Ill., a corporation of Illinois Application June 9, 1941, Serial No. 397,230

12 Claims. (Cl. 53—5)

This invention relates to a new and improved broiler grill for domestic ranges, and a new and improved drip pan therefor.

A careful study of the performance of numerous broiler grills of various designs and constructions has shown that the well known objections of smoky operation and occasional ignition of the fat are caused mainly by too slow drainage of juices off the top of the grill, thus causing smoking or ignition on top of the grill, a secondary cause of smoking and occasional ignition being too much exposure of the contents of the drip pan to the direct heat of the burner. It is, therefore, the principal object of my invention to provide a broiler grill constructed so as to avoid these objections.

A salient feature of the grill of my invention consists in the provision of a large number of drain grooves of comparatively short length, for directing the juices from the middle of the grill in all directions for discharge into the drip pan over the outer edges of the grill instead of, for example, conducting the juices from all portions of the working surface to one corner for discharge into the drip pan at that one point. The shortened travel to the point of discharge into the drip pan minimizes exposure to the heat of the burner, and in that way there is reduced the likelihood of smoking or ignition.

Another important feature of the present grill is the elimination of all slots or drain holes in the grill, the substantially imperforate grill plate or slab effectually shielding the contents of the drip receptacle from the heat of the burner.

Another important feature of the present invention is the provision of a grill having a cutaway corner portion for access to a corner well in the drip pan or serving tray, and the provision of a drip pan having a ledge in the diagonally opposite corner from the well in elevated relation to the well and arranged to serve as a partial closure for the cutaway corner portion of the grill, during the broiling operation, thus further shielding the contents of the drip pan from the heat of the burner to minimize the likelihood of smoking or the possibility of ignition.

The invention is illustrated in the accompanying drawings, in which—

Figure 1 is a top plan view of a broiler grill made in accordance with my invention, illustrated supported in a drip pan;

Fig. 2 is a longitudinal section on the line 2—2 of Fig. 1;

Fig. 3 is a similar section but showing the grill reversed end for end, so as to expose the corner well in the drip pan;

The same reference numerals are applied to corresponding parts throughout the views.

Figure 6:
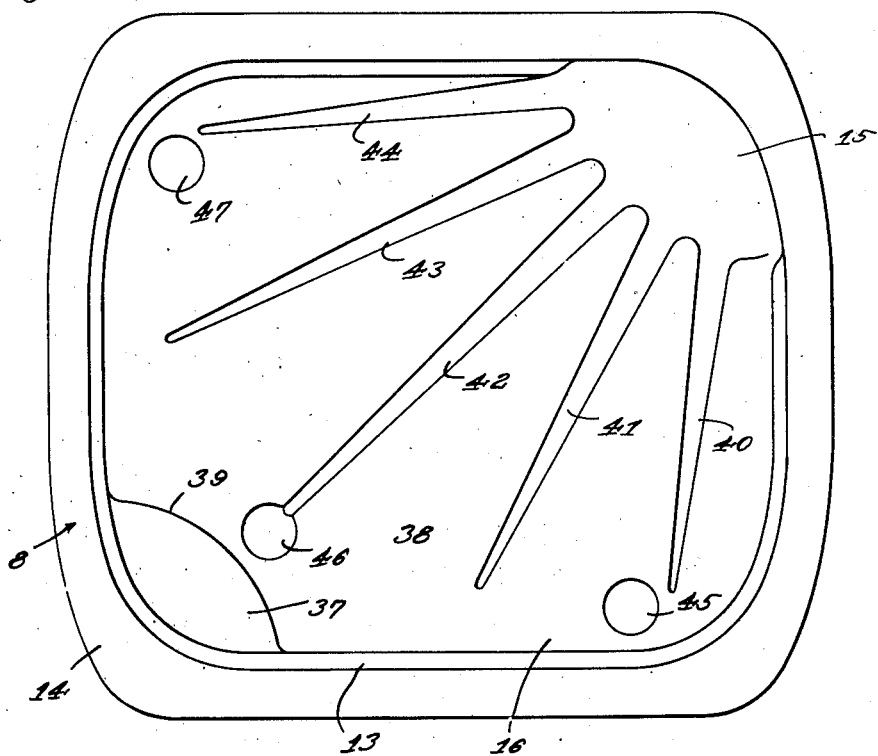
Fig. 6 is a top plan view of the drip pan with the grill removed.
Figure 4:
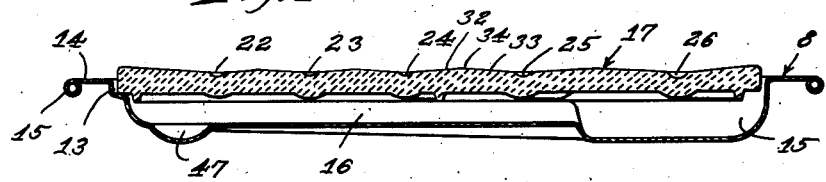
Fig. 4 is a longitudinal section on the line 4—4 of Fig. 1.
Figure 5:
Fig. 5 is a section on the arcuate line 5—5 of Fig. 1.

Referring first to Figs. 1 to 5, the reference numeral 7 designates a smoothly glazed pottery grill made in accordance with my invention, and the reference numeral 8 designates the drip pan of new and improved construction. The grill 7 may be made of heat resistant glass, or cast aluminum, or stamped from sheet steel, or made from any other suitable material, although glazed pottery is preferred for various reasons. The grill comprises a generally rectangular body 9, having one corner portion thereof cut away on an arc, as indicated at 10, the pottery being of course molded to this form. Handles 11 and 12 are molded integral with the body 9 at the opposite ends thereof and are in elevated relation to the plane of the body to the extent clearly indicated in Fig. 5, so that when the grill 7 is placed in the drip pan 8, resting on the annular depressed ledge 13, the handles 11 and 12 are both disposed in elevated relation to the rim portion 14 of the pan and can, therefore, be taken hold of easily without danger of getting the fingers in contact with the hot pan. The handles furthermore project outwardly beyond the curled outer edge portion 15 of the rim 14 of the pan to further facilitate transfer of the grill 7 from the drip pan 8 to a serving tray without danger of burning the fingers. The serving tray in accordance with the disclosure in the copending application of Stanley H. Hobson, Serial No. 293,115, is preferably of substantially identical construction with the drip pan 8, except that whereas the drip pan 8 is usually porcelain enameled, both for cheapness and to make it better adapted to withstand the range temperatures, the serving tray is preferably of stainless steel or chromium plated steel, mainly for attractive appearance in view of its use on the table. During the broiling operation, the grill 7 rests on the ledge 13 in the drip pan 8, while the latter is supported in the usual way on ledges at the desired elevation beneath the broiler burner in a broiling oven or drawer in a domestic cooking range. At the conclusion of the broiling operation, the grill 7 is transferred from the drip pan to the serving tray and carried to the table so as to serve the steak or other meat sizzling hot. The serving tray being cold facilitates the handling of the grill and the carrying thereof to the table, and it protects the table against scorching so that there is no necessity for the use of special pads. The serving tray furthermore protects the table cloth against grease spots. At the time the grill 7 is transferred from the drip pan 8 to the serving tray, juice may be ladled from the well 15, provided in one corner of the depressed central portion 16 of the drip pan, and poured over the meat to make it more delectable, and the rest of the juice may be used in making gravy.

In accordance with one important phase of my invention, the grill 7 has the body 9 thereof substantially imperforate in contrast to all other grills at present available on the market, so far as I am aware. Whereas these other grills have numerous holes or slots provided therein for drainage of juices into the drip pan during the broiling operation, I have provided two series of grooves on lines radiating from the cutaway corner portion 10, the inner series numbered 17—21 being inclined toward the cutaway corner portion 10 and the outer series numbered 22—29 being inclined in the opposite direction toward the outer edges 30 and 31 of the grill body remote from the cutaway corner portion 10. All of these grooves are of gradually increasing width and depth toward their discharge ends, as illustrated by the flaring of these grooves in Fig. 1. The top of the grill is formed to provide oppositely sloping surfaces 32 and 33 between the grooves, the radial lines 34 indicating the high points where these oppositely sloping surfaces intersect midway between the adjacent grooves. The edges 34 are all in approximately the same horizontal plane above the laterally sloping surfaces 32 and 33 and grooves 17—29, so that there is ample opportunity for juices to run down into the grooves from a steak or other meat resting on the grill in contact mainly with the edges 34. Preferably, however, the edges 34 associated with the one group of grooves 17—21 are in a plane inclined downwardly to a small extent from the middle portion 35 of the top surface toward the cutaway corner portion 10, whereas the edge portions 34 associated with the grooves 22—29 are in another plane inclined downwardly to a small extent from the middle portion 35 of the top surface toward the outer edges 30 and 31 of the grill. In that way the middle portion 35, where the meat is usually placed, is at the highest elevation and the surfaces slope downwardly on the opposite sides of this middle portion toward the corner portion 10 on the one hand and toward the outer edges 30 and 31 on the other hand for most efficient drainage of juices from the meat into the drip pan. The juice draining from grooves 17—21 runs down the arcuate edge portion 10 at the cutaway corner of the grill and drops into the drip pan. The juice draining from the grooves 22—29 is conducted downwardly at the outer edges 30 and 31 of the grill into the drip pan through communicating vertical grooves 36 molded in the edge portions 30 and 31 of the body of the grill. These grooves 36, as clearly indicated in Fig. 3, are deep enough in relation to the width of the ledge 13, on which the grill rests in the drip pan, so that the juices drain easily into the pan and will not tend to collect on the ledge. With this construction the juices are conducted away from the meat so quickly that there is little or no danger of the fat igniting or causing smoking. The fact that the grooves 17—29 originate at or near a midpoint of the top surface is of importance, because that assures the shortest possible travel of the juices along the top surface prior to discharge into the drip pan. The short travel of the juices means less exposure to the heat of the burner and consequently less likelihood of the fats smoking or igniting. The fact that the grill is substantially imperforate makes it a more efficient shield for the contents of the drip pan, thereby further reducing likelihood of smoking and ignition.

In accordance with another important phase of my invention, the drip pan 8 has the depressed central portion 16 thereof formed to provide a ledge 37 in the corner of the pan, diagonally opposite the well 15 and at an elevation below the level of the annular ledge 13 but appreciably above the bottom 38 of the depressed central portion 16, so as to serve as a partial closure for the cutaway corner portion 10 of the grill 7 during the broiling operation. The ledge 37 has the inner edge portion 39 thereof struck on an arc slightly greater than the radius of the cutaway corner portion 10 of the grill with the center of the arc at the corner of the pan and substantially coincident with the center of the arc 10, so that when the grill is resting in the drip pan with the cutaway corner portion 10 thereof over the ledge 37, as shown in Figs. 1 and 2, the ledge 37 registers properly with the cutaway corner portion of the grill to shield further the contents of the drip pan from the heat of the burner and accordingly minimize likelihood of smoking or ignition. In passing it will be observed that the drip pan 8 has radiating from the corner juice collecting well 15 a series of grooves 40—44 to conduct the drippings from all portions of the depressed central portion 16 into the well 15. The grooves 40—44 increase in width and depth toward the inner ends where they communicate with the well, as indicated by the flaring thereof, whereby to assure good drainage of juices into the well. Depressed portions 45—47 are in the vicinity of three corners of the pan and cooperate with the depressed well portion 15 at the fourth corner to provide supporting feet in a common plane so that the pan will set level on a table or other supporting surface.

It is believed the foregoing description conveys a good understanding of the objects and advantages of my invention. The appended claims have been drawn to cover all legitimate modifications and adaptations.

I claim:

1. A broiler device comprising, in combination, a drip pan having a depressed central portion forming a drain receptacle, and a substantially imperforate grill removably seated on said pan over said depressed portion presenting a top surface for support thereon of food to be broiled, said grill serving to shield the contents of said drain receptacle from the heat of a broiler burner disposed over the grill, said grill having drain grooves provided in the top thereof extending outwardly from an intermediate region of said top surface to the outer edges of the grill and downwardly along the outer edges for drainage of juices from the top surface into the drip pan, the drip pan having an annular ledge provided in the dished central portion in elevated relation to the bottom of said dished central portion for support thereon of the grill by its outer edge portion, said ledge being of reduced width in relation to the depth of the downwardly directed outer portions of the grooves in said grill measured inwardly from the outer edge of the grill, whereby to facilitate drainage of juices past said ledge into the drip pan.

2. A broiler device comprising, in combination, a generally rectangular drip pan having a depressed central portion forming a drain receptacle, and a generally rectangular grill removably seated on said pan over said depressed portion presenting a top surface for support thereon of food to be broiled, said grill serving to shield the contents of said drain receptacle from the heat of a broiler burner disposed over the grill, one corner portion of said grill being cut away for communication with the drain receptacle, said drip pan having a juice collecting well in one corner of the depressed central portion thereof and having an elevated ledge formed in the diagonally opposite corner of said depressed central portion, the cutaway corner portion of said grill in one position of the grill relative to the pan being disposed in register with and above said ledge so that the ledge shields the contents of said drain receptacle from the heat of the burner, said cutaway corner portion being registrable with the juice collecting well in a reversed position of said grill.

3. A broiler device comprising, in combination, a generally rectangular drip pan having a depressed central portion forming a drain receptacle, and a generally rectangular grill removably seated on said pan over said depressed portion presenting a top surface for support thereon of food to be broiled, said grill serving to shield the contents of said drain receptacle from the heat of a broiler burner disposed over the grill, one corner portion of said grill being cut away for communication with the drain receptacle, said drip pan having a juice collecting well in one corner of the depressed central portion thereof and having an elevated ledge formed in another corner of said depressed central portion, the cutaway corner portion of said grill in one position of the grill relative to the pan being disposed in register with and above said ledge so that the ledge shields the contents of said drain receptacle from the heat of the burner, said cutaway corner portion being registrable with the juice collecting well in another position of said grill.

4. A broiler device comprising, in combination, a generally rectangular drip pan having a depressed central portion forming a drain receptacle, and a substantially imperforate and generally rectangular grill removably seated on said pan over said depressed portion presenting a top surface for support thereon of food to be broiled, said grill serving to shield the contents of said drain receptacle from the heat of a broiler burner disposed over the grill, one corner portion of said grill being cut away for communication with the drain receptacle, said grill having two sets of grooves provided in the top surface thereof on lines radiating from the cutaway corner portion, the one set of grooves extending from an intermediate region of the top surface and communicating with the cutaway corner portion for drainage of juices into the drain receptacle through said corner portion, the other set of grooves extending from the intermediate region of said top surface to vertically extending grooves provided in spaced substantially parallel relation in the outer edges of said grill remote from the cutaway corner portion for drainage of juices into the drain receptacle through said grooves.

5. A broiler device comprising, in combination, a generally rectangular drip pan having a depressed central portion forming a drain receptacle, and a substantially imperforate and generally rectangular grill removably seated on said pan over said depressed portion presenting a top surface for support thereon of food to be broiled, said grill serving to shield the contents of said drain receptacle from the heat of a broiler burner disposed over the grill, one corner portion of said grill being cut away for communication with the drain receptacle, said grill having two sets of grooves provided in the top surface thereof on lines radiating from the cutaway corner portion, the one set of grooves extending from an intermediate region of the top surface and communicating with the cutaway corner portion for drainage of juices to said corner portion, the other set of grooves extending from the intermediate region of said top surface to the outer edges of said grill remote from the cutaway corner portion for drainage of juices to said outer edges, the drip pan having a juice collecting well formed in one corner of the depressed central portion at a low elevation relative to the rest of the central portion and having an elevated ledge formed in another corner of the depressed central portion, the cutaway corner portion of the grill being arranged in one position of the grill to register with said elevated ledge so that the ledge shields the contents of the drain receptacle from the heat of the burner, the cutaway corner portion of the grill in another position of the grill registering with the juice collecting well in said pan.

6. A broiler device comprising, in combination, a generally rectangular drip pan having a depressed central portion forming a drain receptacle, and a substantially imperforate and generally rectangular grill removably seated on said pan over said depressed portion presenting a top surface for support thereon of food to be broiled, said grill serving to shield the contents of said drain receptacle from the heat of a broiler burner disposed over the grill, one corner portion of said grill being cut away for communication with the drain receptacle, said grill having the top surface thereof formed to slope downwardly from an intermediate region of the top surface toward the corner portion and so as to slope downwardly from said intermediate region toward the outer edges of said grill remote from the corner portion, the drip pan having a juice collecting well formed in one corner of the depressed central portion at a low elevation relative to the rest of the central portion and having an elevated ledge formed in another corner of the depressed central portion, the cutaway corner portion of the grill being arranged in one position of the grill to register with said elevated ledge so that the ledge shields the contents of the drain receptacle from the heat of the burner, the cutaway corner portion of the grill in another position of the grill registering with the juice collecting well in said pan.

7. A broiler device comprising, in combination, a drip pan having a depressed central portion forming a drain receptacle, and a grill removably seated on said pan over said depressed portion presenting a top surface for support thereon of food to be broiled, said grill serving to shield the contents of said drain receptacle from the heat of a broiler burner disposed over the grill, one edge portion of said grill being cut away for communication with the drain receptacle, said drip pan having a juice collecting well at one point in the marginal portion of the depressed central portion thereof and having an elevated ledge formed in another marginal portion of said depressed central portion, the cut away edge portion of said grill in one position of the grill relative to the pan being disposed in register with and above said ledge so that the ledge shields the contents of said drain receptacle from the heat of the burner, said cut away edge portion being registrable with the juice collecting well in another position of said grill.

8. A broiler device comprising, in combination, a drip pan having a depressed central portion forming a drain receptacle, and a grill removably seated on said pan over said depressed portion presenting a top surface for support thereon of food to be broiled, said grill serving to shield the contents of said drain receptacle from the heat of a broiler burner disposed over the grill, one edge portion of said grill being cut away for communication with the drain receptacle, said drip pan having a juice collecting well at one point in the marginal portion of the depressed central portion thereof and having an elevated ledge formed in another marginal portion of said depressed central portion, the cut away edge portion of said grill in one position of the grill relative to the pan being disposed in register with and above said ledge, the ledge having the top surface thereof spaced slightly below the bottom of the cut away edge portion of the grill to permit drainage from the grill over said ledge into the depressed central portion of the pan, said cut away edge portion being registrable with the juice collecting well in another position of said grill.

9. A broiler device comprising, in combination, a generally rectangular drip pan having a depressed central portion forming a drain receptacle, and a generally rectangular grill removably seated on said pan over said depressed portion presenting a top surface for support thereon of food to be broiled, said grill serving to shield the contents of said drain receptacle from the heat of a broiler burner disposed over the grill, one corner portion of said grill being cut away for communication with the drain receptacle, said drip pan having a juice collecting well in one corner of the depressed central portion thereof and having an elevated ledge formed in another corner of said depressed central portion, the cutaway corner portion of said grill in one position of the grill relative to the pan being disposed in register with and above said ledge so that the ledge shields the contents of said drain receptacle from the heat of the burner, said ledge and the cutaway corner portion of said grill being so formed and related when the cutaway corner portion of said grill is disposed in register with and above said ledge that a drain passage is provided between said ledge and cutaway corner portion for drainage of juices from the top of the grill into the drain receptacle, said cutaway corner portion being registrable with the juice collecting well in another position of said grill.

10. A broiler device comprising, in combination, a generally rectangular drip pan having a depressed central portion forming a drain receptacle, and a substantially imperforate and generally rectangular grill removably seated on said pan over said depressed portion presenting a top surface for support thereon of food to be broiled, said grill serving to shield the contents of said drain receptacle from the heat of a broiler burner disposed over the grill, one corner portion of said grill being cut away for communication with the drain receptacle, said grill having two sets of grooves provided in the top surface thereof, the one set of grooves extending from an intermediate region of the top surface and communicating with the cutaway corner portion for drainage of juices into the drain receptacle through said corner portion, the other set of grooves extending from the intermediate region of said top surface to vertically extending grooves provided in spaced substantially parallel relation in the outer edges of said grill remote from the cutaway corner portion for drainage of juices into the drain receptacle through said grooves.

11. A broiler device comprising, in combination, a generally rectangular drip pan having a depressed central portion forming a drain receptacle and a marginal ledge for support of a grill, and a substantially imperforate and generally rectangular grill removably seated on said ledge over said depressed portion presenting a top surface for support thereon of food to be broiled, said grill serving to shield the contents of said drain receptacle from the heat of a broiler burner disposed over the grill, one corner portion of said grill being cut away for communication with the drain receptacle, said grill having the top surface thereof formed to slope downwardly from an intermediate portion of the top surface toward the corner portion for drainage of juices from the top of the grill into the drain receptacle, and said top surface being further formed so as to slope downwardly from said intermediate portion toward the outer edges of said grill remote from the corner portion, the outer edges of said grill remote from the corner portion and the ledge being so formed and related to one another to provide a plurality of drain passages between the grill and ledge spaced longitudinally of the said edges of the grill for drainage of juices from the top of the grill into the drain receptacle.

12. A broiler device as set forth in claim 11, wherein the drip pan has a juice collecting well in one corner of the depressed central portion thereof and has an elevated ledge formed in another corner of said depressed central portion, the cutaway corner portion of said grill in one position of the grill relative to the pan being disposed in register with and above said ledge so that the ledge shields the contents of said drain receptacle from the heat of the burner, said cutaway corner portion being registrable with the juice collecting well in another position of said grill.

JOHN F. HENNESSY.